United States Patent Office 3,461,683
Patented Aug. 19, 1969

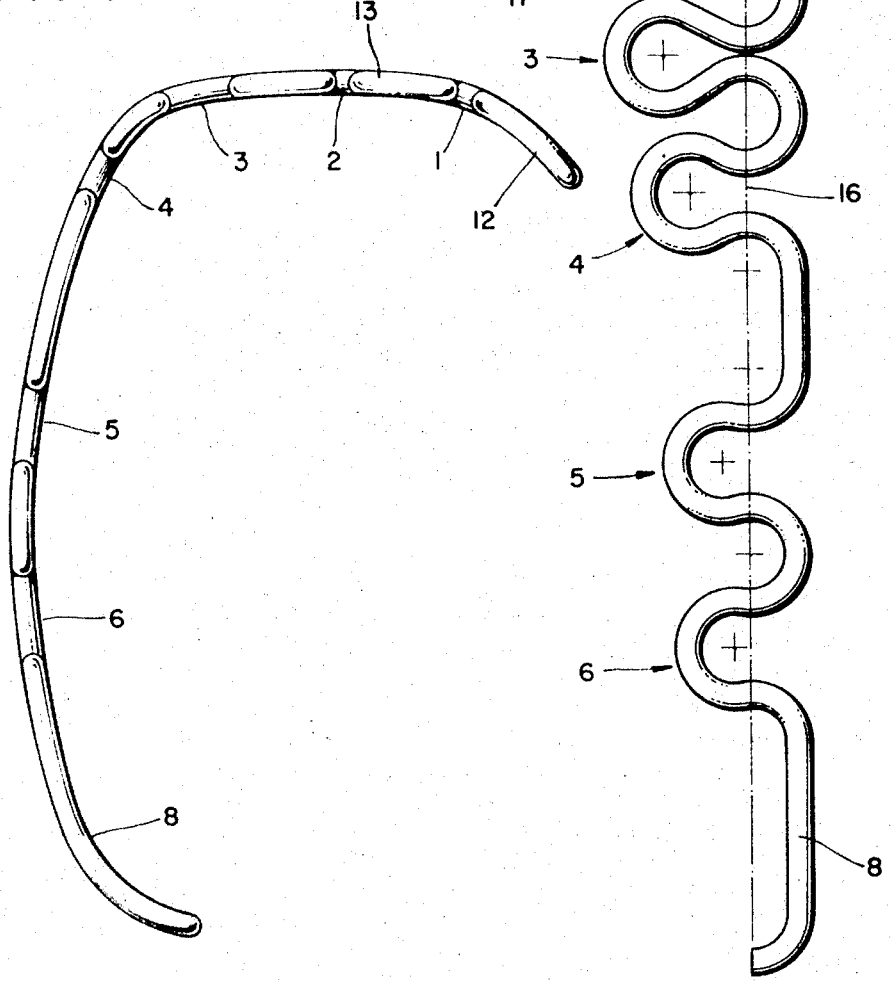

3,461,683
PRESSURE PIPE FOR ENCAPSULATED
REFRIGERATING MACHINE
Knud V. Valbjorn and Kjeld Kjeldsen, Nordborg, and Steinar Skog, Sonderborg, Denmark, assignors to Danfoss A/S, Nordborg, Denmark, a company of Denmark
Filed Jan. 30, 1968, Ser. No. 701,640
Int. Cl. F25d 19/00
U.S. Cl. 62—295                9 Claims

ABSTRACT OF THE DISCLOSURE

The invention relates to motor-compressor refrigerating units of the type which a motor and compressor are contained in a sealed housing. These units have refrigerant pipes which extend from the compressor to the exterior of the housing and these refrigerant pipes are subjected to vibrational forces which cause the pipes to vibrate and create undesirable noises.

---

It is known that the vibrational forces imparted to a refrigerant pipe can be damped by forming the pipe with a series of bends so that the pipe becomes inherently resilient and in effect becomes resiliently mounted in the housing. In the present invention the refrigerant pipe is formed with a series of bends in a manner such that different portions of the pipe have different natural frequencies and the pipe as a whole has a range of natural frequencies. The individual frequencies are of graded magnitudes and spaced relative to each other so as to correspond to the range of frequencies of the exciting source, which is the motor-compressor combination, so that effective damping over the entire band width is achieved.

The present invention relates to a pressure pipe for encapsulated refrigerating machines. The purpose of these pressure pipes is to pass out the refrigerant, under pressure, from the compressor and through the interior of the capsule which is under negative pressure.

United States Patent 3,187,992, Hermetically-Enclosed Refrigerating Machine, June 8, 1965, discloses an encapsulated motor-compressor refrigerating unit which includes a pressure pie of the type to which the present invention is directed.

It is known to impart meandering undulations to this pressure pipe, so that a plurality of hair-pin-shaped pipe portions are respectively connected by a pipe bend. In this way the pressure pipe acquires a certain resilience which enables the motor compressor, resiliently suspended in the capsule, to move freely in the same direction as the forces acting upon it, so that the vibrations caused by the motor compressor are not transmitted to the capsule.

The known undulate pressure pipes consist of meander bends of equal size. A construction is also known wherein two smaller meander bends are present in addition to three large meander bends, so that the pressure pipe does not foul the means for attaching the motor compressor.

In the course of the further development of encapsulated refrigerating machines, a number of individual measures have resulted in a quite considerable reduction of the noise level. The object of the present invention is to reduce the noise in an encapsulated refrigerating machine still further.

According to the invention, this object is achieved by incorporating, in the pressure pipe, at least three portions of differing natural frequency.

A motor compressor generates noise over a large frequency range, wherein the 2,000 to 16,000 cycle-range causes vibrations which are transmitted outwardly by way of the pressure pipe. If portions of differing natural frequency are incorporated in the pipe, these portions are caused to vibrate at their natural frequency, whereby the vibrational energy of the frequency in question is dissipated. If only a few, for example three, natural frequencies are associated with the pipe portions, then these frequencies should be selectively associated with the main frequencies of the source of excitation. If, on the other hand, portions having a large number of natural frequencies are used, damping down over the entire bandwidth can be achieved. The smaller the number of portions of like natural frequency, the smaller is the danger of the portions themselves acting as noise radiators.

It has been shown to be advantageous if the natural frequencies of the portions are so tuned that the interval between them and the natural frequency of another portion is about one third of an octave. This leads to very marked noise reduction, since the initiation of a basic vibration is largely suppressed by a harmonic vibration or vice versa.

It is particularly advantageous of undulations are imparted to the pipe in known manner and at least three pipe portions, each extending between two adjacent crests of the undulation, are given different lengths. For example, meander-shaped undulations can be imparted to the pressure pipe in known manner and at least three meander bends can be of different heights. It is here assumed that in each case a portion between two adjacent crests of the undulations or of the meander bend has a certain natural frequency dependent upon the length of the portion and other constants of the material. Differing natural frequencies can be very simply obtained by a simple proportioning of the lengths.

Expediently, the two halves of a meander bend will be of only approximate equal length. Consequently, the natural frequencies of the two halves will also differ slightly. This disharmony widens the range of the frequencies filtered out by this meander bend.

If all the meander bends are of different height, a number of differently tuned pipe portions are obtained. This results in a vibration filter which covers a large frequency range, but no individual pipe portion is able to vibrate sufficiently strongly to cause disturbing noise. It is here recommended that the heights of the meander bends should decrease linearly. This not only facilitates manufacture of the pressure pipe, but also ensures its very necessary rigidity.

Constructionally, the frequency interval of about ⅓ cycle can be very advantageously achieved by increasing the difference in height between the centre point of one tube bend and the centre points of two adjacent tube bends by 60% in each case.

The invention will now be described by reference to an embodiment illustrated in the drawing, wherein:

FIG. 1 shows a plan view of a pressure pipe according to the invention, and

FIG. 2 shows the developed pipe seen from the side.

The pressure pipe consists of six meander bends 1, 2, 3, 4, 5 and 6, which are contiguous with each other and are provided with two connecting portions 7 and 8. Each meander bend comprises a hair-pin-shaped pipe portion having a bend 9 and two roughly straight pipe portions 10 and 11, as well as two half bends 12 and 13, so that it extends roughly between the crests A—A. One half 14 of the meander bend therefore lies between the crests A—B.

The centre points 15 of the bends 13 and 14 lie on a straight line 16. The centre points 17 of the hair-pin bends 9 are disposed at a different distance from this straight line. From the meander bend 1 to the meander bend 6, this distance decreases successively as follows: 40, 25, 16, 10, 6 and 4 mm. Here, the inner radius of the hair-pin bends is 7 mm. The dimensions of the pipe are 3.96 x 0.5 mm. This gives approximate natural frequencies in the meander bends of 5,000, 6,300, 8,000, 10,000, 12,000 and 16,000 cycles. The halves of the meander bends are of slightly different length in that a wider range of absorbed frequencies is obtained on either side of the values stated.

The various meanders can be disposed in different planes; a meander bend can itself be disposed over a curved area. The undulate pressure pipe can, in particular, be bent in the usual way in such manner that, as shown in FIG. 1, it extends over the greater part of the periphery of the motor compressor near the wall of the capsule. Straight pipe portions can be interposed between the meander bends; these bends may also be contiguous with each other. Nor is it necessary for the meander bends to be arranged according to size, i.e. to form a series having increasing or diminishing height.

What is claimed is:

1. A pressure pipe for a motor-compressor refrigerating unit of the type comprising, a housing, a compressor disposed in said housing, and a pressure pipe extending between said compressor and a pipe opening in said housing, said pressure pipe comprising first, second and third portions thereof with each said portion having a natural frequency which differs from the natural frequencies of either of the other two portions.

2. A pressure pipe according to claim 1 wherein said second pipe portion has a natural frequency about one-third of an octave greater than the natural frequency of said first portion, and said third pipe portion has a natural frequency about one-third of an octave greater than the natural frequency of said second portion.

3. A pressure pipe according to claim 1 wherein at least one of said pipe portions comprises a meander bend having five sections with one 180° bend, two elongated lengths of pipe connected to opposite ends of said 180° bend, and two pipes each having at least a 90° bend connected to said two lengths of pipe at the opposite end thereof from said 180° bend.

4. A pressure pipe according to claim 3 wherein at least three sections of one of said pipe portions are of varying length.

5. A pressure pipe according to claim 3 wherein each of said three pipe portions comprises a meander bend, each of said three meander bends being of different height than said other two.

6. A pressure pipe according to claim 3 wherein said meander bend of one of said pipe portions has the two halves thereof of only approximately equal length.

7. A pressure pipe according to claim 3 wherein all of said pipe portions have meander bends with all of the meander bends being of different heights.

8. A pressure pipe according to claim 5 wherein the heights of said meander bends increase linearly.

9. A pressure pipe according to claim 5 wherein one meander bend has a height 60% greater than and 40% less than two other meander bends, respectively.

References Cited

UNITED STATES PATENTS

| 3,154,245 | 10/1964 | Roelsgaard | 230—232 |
| 3,187,991 | 6/1965 | Roelsgaard | 230—232 |
| 3,187,992 | 6/1965 | Roelsgaard | 230—232 |
| 2,010,546 | 8/1935 | Kenney | 62—296 |
| 2,215,534 | 9/1940 | Smith | 62—295 |
| 2,651,187 | 9/1953 | Harris et al. | 62—295 |

LLOYD L. KING, Primary Examiner

U.S. Cl. X.R.

62—296, 467; 230—232